(12) United States Patent
Chamandy et al.

(10) Patent No.: US 9,842,231 B2
(45) Date of Patent: Dec. 12, 2017

(54) SYSTEM METHOD AND APPARATUS FOR ANTI COUNTERFEITING SERIALIZATION

(71) Applicant: Avery Dennison Retail Branding and Information Solutions, Mentor, OH (US)

(72) Inventors: Paul A. Chamandy, Ithaca, NY (US); John W. Moliski, Sayre, PA (US)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 0 days.

(21) Appl. No.: 14/505,780

(22) Filed: Oct. 3, 2014

(65) Prior Publication Data

US 2015/0193676 A1    Jul. 9, 2015

Related U.S. Application Data

(60) Provisional application No. 61/923,907, filed on Jan. 6, 2014.

(51) Int. Cl.
| | |
|---|---|
| *G06F 21/73* | (2013.01) |
| *G06Q 10/08* | (2012.01) |
| *G06Q 30/00* | (2012.01) |
| *G06Q 99/00* | (2006.01) |
| *G09C 1/00* | (2006.01) |
| *B41M 3/14* | (2006.01) |
| *G06K 15/02* | (2006.01) |
| *G06K 17/00* | (2006.01) |
| *H04N 1/00* | (2006.01) |
| *H04N 1/32* | (2006.01) |

(52) U.S. Cl.
CPC ............... *G06F 21/73* (2013.01); *B41M 3/14* (2013.01); *G06K 15/02* (2013.01); *G06Q 10/087* (2013.01); *G06Q 30/0185* (2013.01); *G06Q 99/00* (2013.01); *G09C 1/00* (2013.01); *H04N 1/00326* (2013.01); *H04N 1/32101* (2013.01); *G06K 2017/0064* (2013.01); *Y10S 283/901* (2013.01)

(58) Field of Classification Search
None
See application file for complete search history.

(56) References Cited

U.S. PATENT DOCUMENTS

| | | | | |
|---|---|---|---|---|
| 5,367,148 | A  * | 11/1994 | Storch et al. | 340/5.86 |
| 6,442,276 | B1 * | 8/2002  | Doljack | G06K 17/00 380/51 |
| 7,283,630 | B1 * | 10/2007 | Doljack | 380/55 |
| 8,001,383 | B2 * | 8/2011  | Hughes | 713/171 |
| 8,712,856 | B2 * | 4/2014  | Junger et al. | 705/23 |

(Continued)

*Primary Examiner* — Scott A Rogers
(74) *Attorney, Agent, or Firm* — Avery Dennison Retail Information Services, LLC

(57) ABSTRACT

An anti-counterfeiting serialization method. The method can include receiving an input serial number, locating a seed character at a predetermined position in the input serial number, determining, based on the seed character, a first output position for an incrementing character of the input serial number, determining, based on the incrementing character, at least one second output position for at least one remaining character of the input serial number, and generating an output serial number having the incrementing character in the first output position and at least one remaining character in the at least one second output position.

20 Claims, 4 Drawing Sheets

(56) References Cited

U.S. PATENT DOCUMENTS

| | | | | |
|---|---|---|---|---|
| 9,027,147 B2* | 5/2015 | Simske | .................. | G06F 21/60 |
| | | | | 726/26 |
| 9,666,008 B2* | 5/2017 | Hill | ...................... | G07D 7/0032 |
| 2011/0049862 A1* | 3/2011 | Hill | ...................... | G07D 7/0033 |
| | | | | 283/70 |
| 2012/0254051 A1* | 10/2012 | Gao et al. | ..................... | 705/318 |
| 2012/0254052 A1* | 10/2012 | Gao et al. | ..................... | 705/318 |
| 2012/0271773 A1* | 10/2012 | Pieri | ............................ | 705/318 |

\* cited by examiner

300

| Char. in seed position | Scrambled position of incrementing char. | Char. in seed position | Scrambled position of incrementing char. | Char. in seed position | Scrambled position of incrementing char. |
|---|---|---|---|---|---|
| B | 9 | P | 8 | 0 | 9 |
| C | 5 | Q | 6 | 1 | 1 |
| D | 6 | R | 7 | 2 | 2 |
| F | 3 | S | 10 | 3 | 7 |
| G | 11 | T | 2 | 4 | 5 |
| H | 1 | V | 9 | 5 | 8 |
| J | 10 | W | 3 | 6 | 4 |
| K | 7 | X | 4 | 7 | 3 |
| L | 2 | Y | 7 | 8 | 11 |
| M | 7 | Z | 5 | 9 | 10 |
| N | 1 | | | | |

| Scramble sequence for incrementing character in scrambled position 9 |||||||||||||||| |
|---|---|---|---|---|---|---|---|---|---|---|---|---|---|---|---|---|
| Incrementing char. value | Unscrambled position |||||||||||||||  |
| | 1 | 2 | 3 | 4 | 5 | 6 | 7 | 8 | 9 | 10 | 11 | 12 | 13 | 14 | 15 | |
| 0 | 5 | 9 | 8 | 1 | 12 | 6 | 14 | 7 | 15 | 11 | 13 | 3 | 10 | 4 | 2 | Scrambled position |
| 1 | 10 | 5 | 12 | 8 | 13 | 6 | 7 | 11 | 15 | 2 | 9 | 1 | 14 | 3 | 13 | |
| 2 | 12 | 4 | 1 | 13 | 9 | 6 | 3 | 14 | 15 | 2 | 8 | 10 | 5 | 7 | 11 | |
| 3 | 3 | 8 | 11 | 2 | 14 | 6 | 9 | 10 | 15 | 13 | 12 | 7 | 4 | 1 | 5 | |
| 4 | 3 | 12 | 9 | 2 | 8 | 6 | 13 | 11 | 15 | 4 | 5 | 10 | 14 | 7 | 1 | |
| 5 | 10 | 3 | 5 | 1 | 7 | 6 | 11 | 12 | 15 | 9 | 8 | 13 | 4 | 14 | 2 | |
| 6 | 8 | 5 | 2 | 14 | 11 | 6 | 7 | 4 | 15 | 9 | 3 | 10 | 13 | 12 | 1 | |
| 7 | 13 | 5 | 7 | 8 | 1 | 6 | 11 | 12 | 15 | 14 | 10 | 2 | 3 | 4 | 9 | |
| 8 | 14 | 8 | 5 | 7 | 12 | 6 | 3 | 11 | 15 | 10 | 13 | 9 | 1 | 2 | 4 | |
| 9 | 5 | 10 | 9 | 3 | 11 | 6 | 7 | 13 | 15 | 14 | 8 | 1 | 12 | 4 | 2 | |

*Fig. 3b*

SYSTEM METHOD AND APPARATUS FOR ANTI COUNTERFEITING SERIALIZATION

CROSS-REFERENCE TO RELATED APPLICATION(S)

The present application claims priority from U.S. Provisional Application No. 61/923,907 filed Jan. 6, 2014, which is incorporated by herein by reference in its entirety.

BACKGROUND OF THE INVENTION

Counterfeiting of consumer goods is a rapidly increasing problem, and results in hundreds of billions of dollars in losses annually. Counterfeit products made to low quality standards impact not only revenues but also the good will of a brand, and can endanger the consumers of the product as well.

Counterfeiters have devised numerous tactics to attempt to pass off counterfeit goods as genuine branded products. One such tactic is to provide counterfeit goods with serial numbers that mimic the serial numbers of authentic products. Known serialization schemes typically include at least one sequentially incrementing digit that is located at the same position in the serial number. It is therefore easy for counterfeiters to imitate a range and scheme of serial numbers simply by looking at a small batch of serial numbers, identifying the incrementing digits, and printing labels, according to the scheme, that appear to be authentic.

It is therefore desirable to increase the difficulty of reverse-engineering serial numbers so as to impede counterfeiters from easily determining the serialization scheme of the numbers.

SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

According to at least one exemplary embodiment, an anti-counterfeiting serialization method. The method can include receiving an input serial number, locating a seed character at a predetermined position in the input serial number, determining, based on the seed character, a first output position for an incrementing character of the input serial number, determining, based on the incrementing character, at least one second output position for at least one remaining character of the input serial number, and generating an output serial number having the incrementing character in the first output position and at least one remaining character in the at least one second output position.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE FIGURES

Advantages of embodiments of the present invention will be apparent from the following detailed description of the exemplary embodiments. The following detailed description should be considered in conjunction with the accompanying figures in which:

FIG. 3a shows an exemplary sequence position table;

FIG. 3b shows an exemplary scramble sequence table;

DETAILED DESCRIPTION OF THE INVENTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Figure 1:
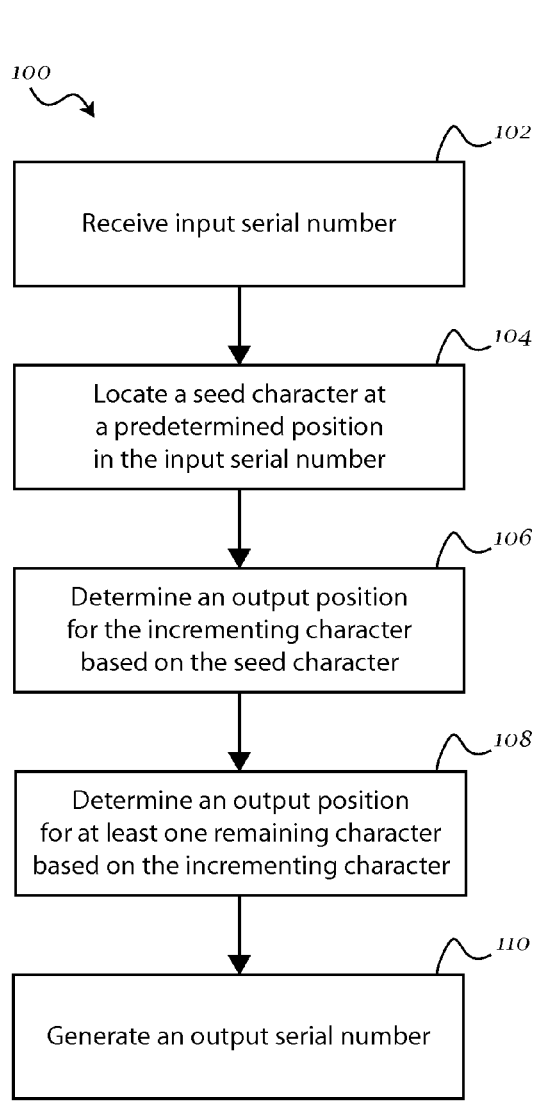
FIG. 1 shows an exemplary method for anti-counterfeiting serialization.

Referring now to FIGS. 1-5b, a method for anti-counterfeiting serialization 100 is disclosed. Method 100 is shown in FIG. 1, and may be implemented on any known computing device. At step 102, an input serial number may be received. The input serial number may be any serial number having any desired length, and may be part of a set of serial numbers according to any desired serialization scheme.

Figure 2A:
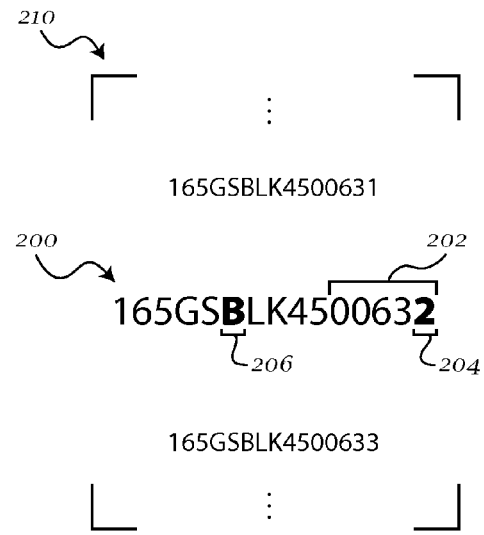
FIG. 2a shows an exemplary unscrambled serial number.

An exemplary input serial number 200 having fifteen digits is shown in FIG. 2a. Exemplary input serial number 200 may be part of a set 210 of serial numbers. The input serial number 200 may have an incrementing portion 202, which may include at least one incrementing character 204. The incrementing character 204 may be any character of the serial number 200 that sequentially increments for each serial number in set 210. In the exemplary input serial number 200, the incrementing portion 202 is located at the end of the serial number, while the incrementing character 204 is located at the end of incrementing portion 202.

Turning back to FIG. 1, at step 104, a seed character may be located at a predetermined position in the input serial number. The predetermined position of the seed character may be located at any desired position in the input serial number that is not part of the incrementing portion 202. For example, in the input serial number 200, a seed character 206 may be located in the sixth ($6^{th}$) position of the serial number. Furthermore, the position of seed character 206 can be the same for each serial number within the set 210 of input serial numbers.

Once the seed character is located, the order of characters for the scrambled output serial number may be determined. At step 106, an output position for the incrementing character may be determined. The output position for the incrementing character may be based on the value of the seed character of the input serial number. The output position for the incrementing character may be determined by referring to a sequence position table. An exemplary sequence position table 300 is shown in FIG. 3*a*. The sequence position table 300 can include a list of seed characters 302, with each seed character 302 corresponding to an output position 304 for the incrementing character in the output serial number. For the illustrated exemplary embodiment, wherein the input serial number has a seed character with a value of "B" in the sixth position, the resulting output position for the incrementing character would be the ninth position of the output serial number.

At step 108, the output positions for at least one remaining character may be determined, the remaining characters being any character in the serial number that is not the seed character or the incrementing character. The output positions for remaining characters may be based on value of the incrementing character of the input serial number, as well as based on the output position of the incrementing character in the output serial number. The output positions for remaining characters may be determined by referring to a scramble sequence table.

An exemplary scramble sequence table 310 is shown in FIG. 3*b*. A separate scramble sequence table may be provided for each possible output position of the incrementing character. The scramble sequence table 310 can include a list of incrementing characters 312, with each incrementing character corresponding to a scramble sequence 314. Each scramble sequence 314 can include a list of scrambled positions 316, with each scrambled position corresponding to an unscrambled position 318. For each incrementing character 312, the corresponding scramble sequence 314 may be unique with respect to the other scramble sequences in the particular table 310, or in all scramble sequence tables 310. In the illustrated exemplary embodiment, a scramble sequence table corresponding to a scrambled position of "9" for the incrementing character can be selected. Subsequently, a scramble sequence for an incrementing character value of "2" can be selected and the output scrambled positions for at least one remaining character can be determined according to the selected scramble sequence. For the other serial numbers in the set of serial numbers, a scramble sequence corresponding to the value of the incrementing character of the particular serial number can be selected from the same scramble sequence table.

Figure 2B:
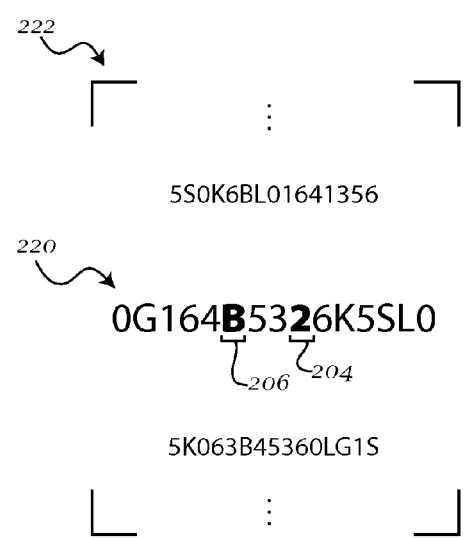
FIG. 2b shows the serial number of FIG. 2a scrambled according to the method of FIG. 1.
Figure 4:
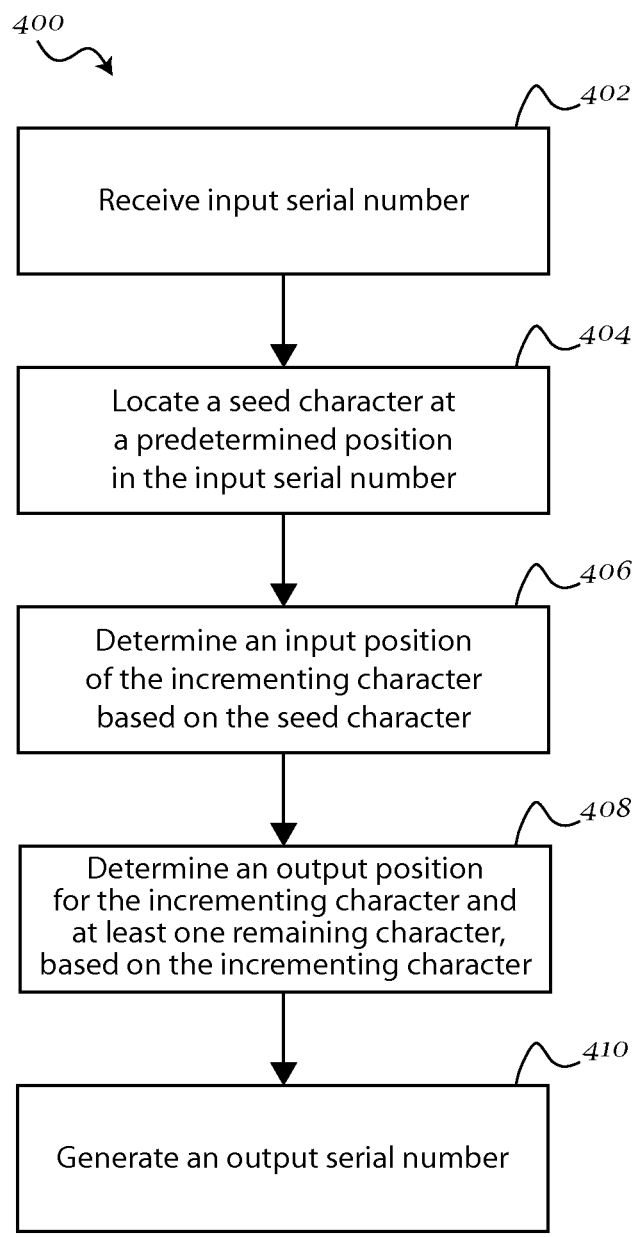
FIG. 4 shows another exemplary method for anti-counterfeiting serialization.

Once all desired output positions have been determined, at step 110, the output scrambled serial number may be generated. An exemplary output scrambled serial number 220 is shown in FIG. 2*b*. The characters of output serial number 220 have been scrambled according to the scramble sequence shown in FIG. 3*b* for an incrementing character having a value of "2" and located at output position "9". It should be noted that for every output serial number in the set of output serial numbers 222, the incrementing character 204 is located in the same output position. Furthermore, for every output serial number in the set of output serial numbers 222, the seed character 206 is located in the same output position, which is also the same as the input position of the seed character.

In some exemplary embodiments, the output position of the incrementing digit may be limited to a range of positions that are located away from the edges of the output serial number. For example, for a fifteen-character serial number, the incrementing digit may be disposed between the third and the eleventh position of the output serial number. Such positioning of the incrementing digit can serve to make the incrementing digit less obvious to a counterfeiter attempting to determine the sequencing scheme of the serial number.

Descrambling of a scrambled serial number can be performed according to an exemplary method 400. At step 402, the input scrambled serial number may be received. At step 404, the seed character may be located at a predetermined position in the input scrambled serial number, which would be the same position as in an unscrambled serial number. At step 406, the position of the incrementing character in the input serial number may be determined by referencing a sequence position table 300. The value of the incrementing character can thus be identified. At step 408, the output position of the incrementing character and at least one remaining character can be determined by referencing a scramble sequence table 310 so as to select a scramble sequence corresponding to the value of the incrementing character. The output positions can then be determined by comparing the selected scramble sequence to the unscrambled positions. At step 408, an output unscrambled serial number may be generated once all output positions have been determined.

It should be appreciated that while the exemplary embodiments discussed above referred to a fifteen-digit serial number and a seed character in the sixth position of the serial number, the method disclosed herein may be used with serial numbers of any desired length or combination of characters, e.g. numeric, alphanumeric, letters, geometric figures and the like. Likewise, the positioning of the seed character, the incrementing character and any remaining characters may be varied as desired. Additionally, the sequence positions and scramble sequences in tables 300, 310 are merely exemplary, and may be varied as desired.

Figure 5A:
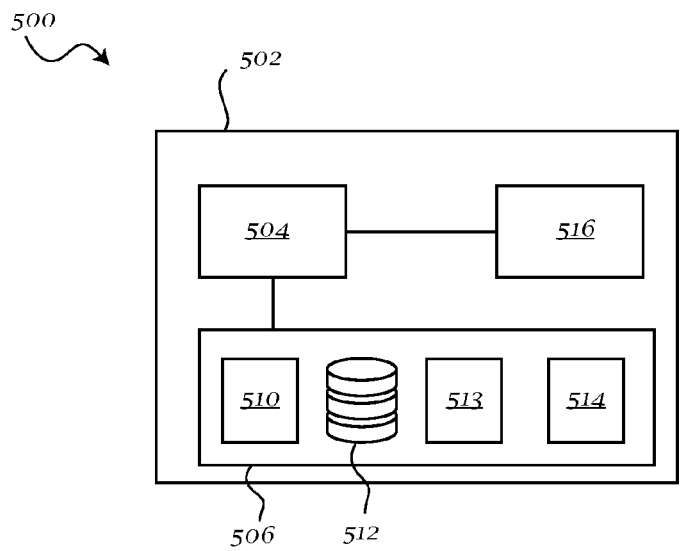
FIGS. 5a-5b show exemplary systems for anti-counterfeiting serialization.

FIG. 5*a* shows an example embodiment of a system 500 for anti-counterfeiting serialization. System 500 may include at least one computing device 502. Computing device 502 may be any known computing device having a processor 504 and a non-transitory computer-readable medium 506 on which instructions 510 for implementing methods 100 and 400 may be stored. Processor 504 may serve to execute instructions 510 as well as any other desired instructions or software.

Database 512, database software 513, and serialization software 514 may be stored on the computer-readable medium 506 of computing device 502. Computing device 502 may also include, or be communicatively coupled to, a printing device 516, which may be any printing device known in the art.

The printing device 516 may be used to print labels, tags, or other substrates that may be attached or otherwise connected to a consumer product or other item of value. The tag or label may contain additional human readable indicia such as brand identifiers, care instructions, components, origin of manufacture, sizes or any other information that the manufacturer may wish to add to the tag or label. In addition, the tag or label may also include a radio frequency identification (RFID) device which can contain additional information relating to the particular product with which it is associated. For example the RFID device can have a unique ID number in addition to product related information which may be provided via an electronic product code (EPC). Use of an RFID device along with the serialized chain provided herein may provide additional product security and authenticity.

Exemplary RFID devices are available from Avery Dennison Retail Information Services, LLC, of Westborough, Mass.

The printing device 516 can also print other machine readable indicia such as bar codes, 2D codes and the like. These codes may be scanned by a mobile device or other machine vision type system to provide further security.

Figure 5B:
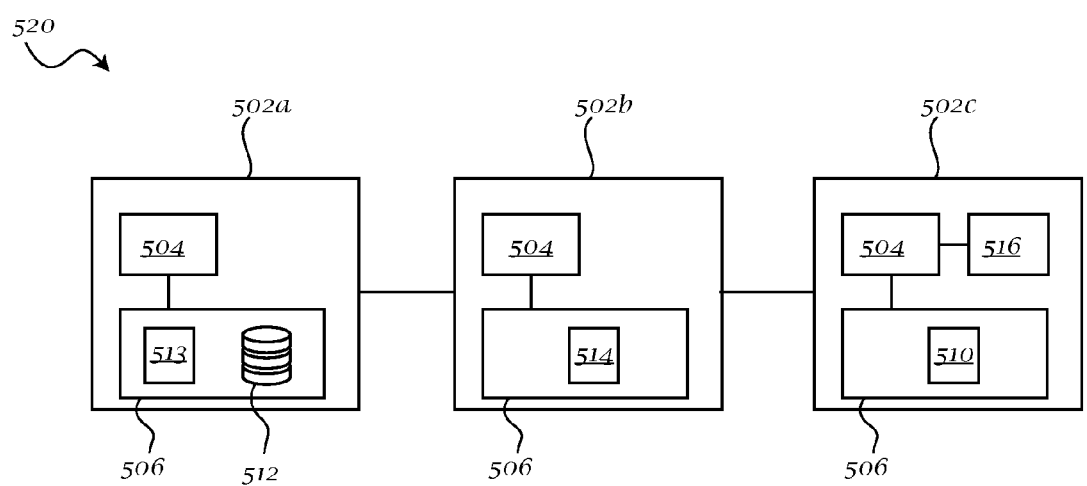

FIG. 5b shows another exemplary embodiment of a system 520 for anti-counterfeiting serialization. System 520 may include a plurality of computing devices 502a, 502b, 502c. Computing devices 502 may be any known computing device having a processor 504 and a non-transitory computer-readable medium 506. For example, computing device 502a may be or may include a peripheral device, such as a printing device 516. Instructions 510 for implementing method 100 may be stored on the computer-readable medium 506 of computing device 502a. Computing device 502a may be in communication with computing device 502b via any wired or wireless communications protocol.

Computing device 502b may include serialization software 514 and may include a user-accessible interface. Computing device 502c may include database 512 and database software 513 and may be a local or remote server. Database software 513 may further be adapted to implement method 400. Computing device 502b may be in communication with computing device 502c via a local-area or wide-area network, or any other wired or wireless communications protocol.

In the exemplary embodiments, database 512 may store a plurality of batch numbers. The batch numbers may be retrieved from database 512 and sent to serialization software 514. Serialization software 514 may generate unscrambled serial numbers from the batch numbers, for example by combining the batch numbers with other serial number portions, for example product ID numbers, and so forth. The serial numbers generated by serialization software 514 may then be sent to database 512 and to printing device 516.

Prior to printing, the serial numbers may then be scrambled according to method 100. This may be performed by serialization software 514, or by printing device 516. The set of scrambled serial numbers may then be printed by printing device 516. Once the scrambled serial numbers are printed, a confirmation, for example including a batch ID and the quantity of serial numbers printed may be sent from printing device 516 to database 512. The printed serial numbers are thus identified as printed in database 512. The serial numbers may be stored in database 512 in an unscrambled format.

To verify a serial number, for example to determine that a product is genuine, the serial number may be scanned or entered into an interface that is in communication with database 512. Database software 513 may determine whether an entered serial number is scrambled or unscrambled, for example by checking the length and format of the number. If the entered serial number is scrambled, database software 513 may perform the steps of method 400 so as to unscramble the serial number. The unscrambled serial number may then be matched to the serial numbers stored in database 512. If a match exists, it may be determined that the entered serial number is genuine.

Thus, the embodiments disclosed herein present an anti-counterfeiting serialization method that increases the difficulty of reverse-engineering a serial number scheme from a batch of serial numbers, while allowing easy verification of the authenticity of a serial number.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. An anti-counterfeiting serialization method implemented on a computing device, comprising:
   providing a computing device;
   receiving an input serial number on the computing device;
   locating a seed character for use on a label, tag or other substrate at a predetermined position in the input serial number;
   determining, based on the seed character, a first output position for an incrementing character of the input serial number;
   determining, based on the incrementing character, at least one second output position for at least one remaining character of the input serial number;
   generating an output serial number having the incrementing character in the first output position and at least one remaining character in the at least one second output position; and
   printing a label, tag or other substrate with the output serial number.

2. The method of claim 1, wherein the at least one second output position is determined based on the value of the incrementing character and based on the first output position.

3. The method of claim 1, wherein the position of the seed character in the output serial number is the same as the position of the seed character in the input serial number.

4. The method of claim 1, wherein the computing device comprises a printer.

5. A system implementing the method of claim 1.

6. A computer-readable medium storing instructions for implementing the method of claim 1.

7. An anti-counterfeiting serialization method implemented on a computing device, comprising:
   providing a smart device
   receiving an input serial number for use on the smart device;
   locating a seed character at a predetermined position in the input serial number;
   determining, based on the seed character, an input position of an incrementing character of the input serial number;
   determining, based on the incrementing character, a first output position for the incrementing character and at least one second output position for at least one remaining character of the input serial number;
   generating an output serial number having the incrementing character in the first output position and at least one remaining character in the at least one second output position; and
   printing a label with the output serial number.

8. The method of claim 7, wherein the at least one second output position is determined based on the value of the incrementing character and based on the first output position.

9. The method of claim 7, wherein the position of the seed character in the output serial number is the same as the position of the seed character in the input serial number.

10. A system implementing the method of claim 7.

11. A computer-readable medium storing instructions for implementing the method of claim 7.

12. An apparatus for anti-counterfeiting serialization, comprising:
  processor means; and
  computer-readable medium means storing instructions that, when executed by the processor means, perform the steps of:
    receiving an input serial number;
    locating a seed character at a predetermined position in the input serial number;
    determining, based on the seed character, a first output position for an incrementing character of the input serial number;
    determining, based on the incrementing character, at least one second output position for at least one remaining character of the input serial number;
    generating an output serial number having the incrementing character in the first output position and at least one remaining character in the at least one second output position; and
    printing a label having the output serial number.

13. The apparatus of claim 12, further comprising printing means.

14. The apparatus of claim 12, wherein the apparatus is adapted to print the output serial number.

15. The apparatus of claim 14, wherein the output serial number is printed as a label for an article of commerce.

16. An anti-counterfeiting serialization system, comprising:
  a database for storing at least one serial number; and
  a database containing a computer-readable medium means storing instruction that, when executed by the a processor, the processor performs the steps of:
    receiving an input serial number from the database;
    locating a seed character at a predetermined position in the input serial number;
    determining, based on the seed character, a first output position for an incrementing character of the input serial number;
    determining, based on the incrementing character, at least one second output position for at least one remaining character of the input serial number; and
    generating an output serial number having the incrementing character in the first output position and at least one remaining character in the at least one second output position;
  a printing device for printing the output serial number.

17. The system of claim 16, further comprising:
  a computer-readable medium means storing instructions that, when executed by the processor means, perform the steps of:
    receiving an input serial number;
    locating a seed character at a predetermined position in the input serial number;
    determining, based on the seed character, an input position of an incrementing character of the input serial number;
    determining, based on the incrementing character, a first output position for the incrementing character and at least one second output position for at least one remaining character of the input serial number; and
    generating an output serial number having the incrementing character in the first output position and at least one remaining character in the at least one second output position.

18. The system of claim 17, wherein the instructions further comprise the step of comparing the output serial number to the at least one serial number stored in the database.

19. The method of claim 16, wherein the at least one second output position is determined based on the value of the incrementing character and based on the first output position.

20. The method of claim 16, wherein the position of the seed character in the output serial number is the same as the position of the seed character in the input serial number.

* * * * *